UNITED STATES PATENT OFFICE.

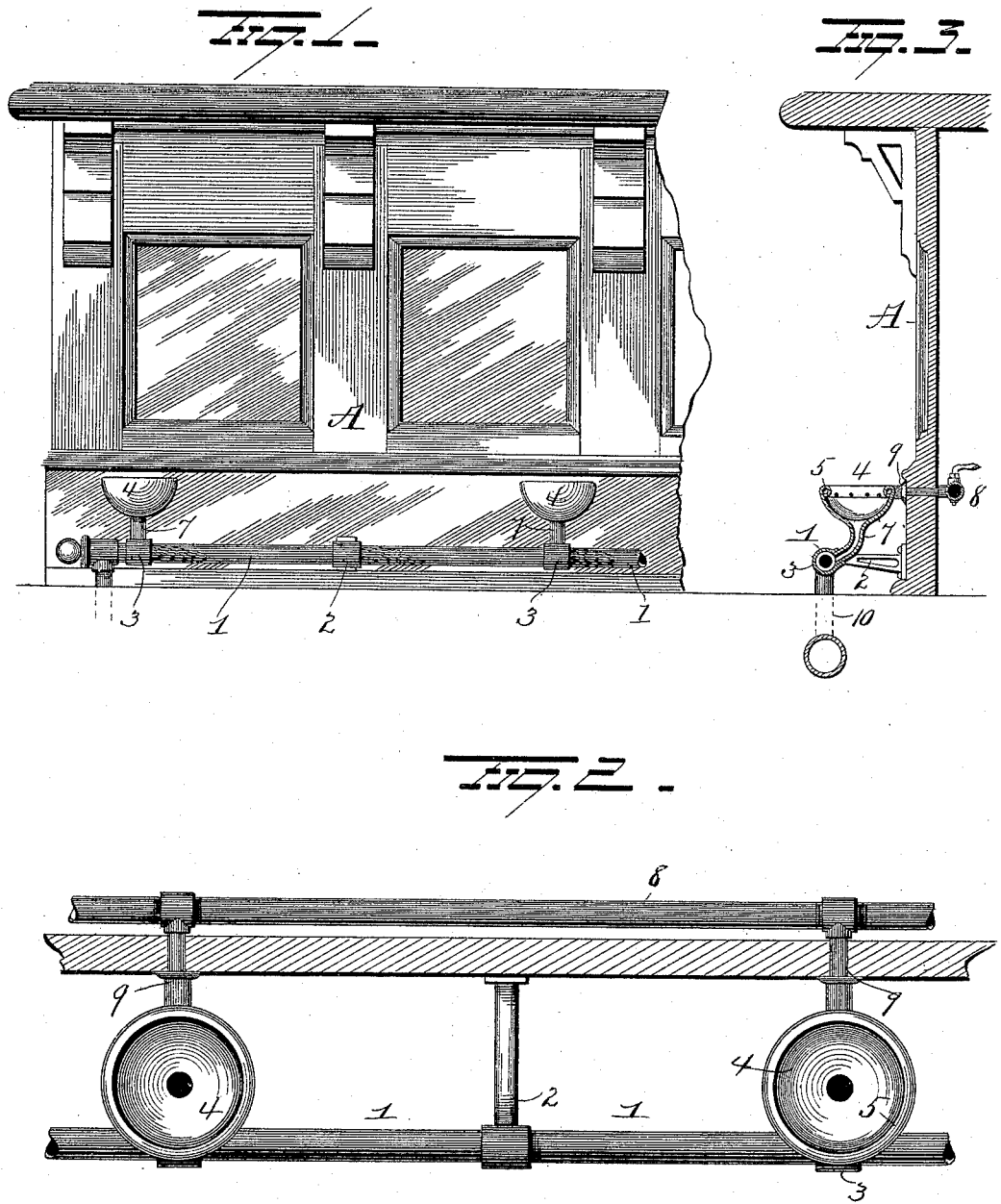

JOHN SOLTWEDEL AND EDWARD MATHIAS, OF WHITING, INDIANA.

SPITTOON.

SPECIFICATION forming part of Letters Patent No. 586,207, dated July 13, 1897.

Application filed April 16, 1896. Serial No. 587,811. (No model.)

*To all whom it may concern:*

Be it known that we, JOHN SOLTWEDEL and EDWARD MATHIAS, of Whiting, in the county of Lake and State of Indiana, have invented certain new and useful Improvements in Spittoons; and we do hereby declare the following to be a full, clear, and exact description of the invention, such as will enable others skilled in the art to which it appertains to make and use the same.

Our invention relates to an improvement in spittoons, and is designed more particularly for use in bar-rooms, billiard-rooms, hotels, and the like, the object being to provide a series of self-cleaning spittoons adapted to be conveniently secured on or adjacent to a counter or similar fixture.

With this end in view our invention consists in certain novel features of construction and combinations of parts, as will be hereinafter more fully described, and pointed out in the claim.

In the accompanying drawings, Figure 1 represents a view of our improvement attached to a bar. Fig. 2 is a plan view, the top of the bar being removed; and Fig. 3 is a view in vertical section.

A represents a bar or counter, and 1 a combined discharge-pipe and foot-rail, which latter is supported by the brackets 2 2 2. These brackets are preferably secured to the bar at suitable points adjacent to the floor, but, if desired, they may be secured directly to the floor. Discharge-pipe 1 is provided at intervals throughout its length with couplings 3 for the attachment of the spittoons 4, each of which latter consists of a flaring or funnel-shaped mouth provided with an annular perforated recess 5 and an extended hollow curved arm 7. The annular perforated recesses 5 are connected to the water-supply pipe 8 through the medium of the short pipe connections 9, as shown in Fig. 2 of the drawings.

The discharge-pipe 1 is connected to a waste-pipe leading to a sewer or receptacle.

The water to supply-pipe 8 may be regulated or cut off at night or on days when the room is not in use, if desired, by a suitable cut-off located at some convenient point behind the bar or counter.

The object of our invention is to provide a series of self-cleaning spittoons wherein a continuous flow of water over the inner surface of the flaring or funnel-shaped mouths of spittoons 4 is maintained, as well as a continuous stream of water from that point to the sewer. The operation necessary to accomplish this result with the improvement above described is very simple, it only being necessary to turn on the cut-off, so as to furnish a continuous stream of water to supply-pipe 8, after which the spittoons and connected parts will require no attention. The continuous stream thus furnished will flow through said supply-pipe 8 and thence through connections 9 to annular perforated recesses or pipes 5, where said water is equally distributed through the perforations of said pipes or recesses onto the inner faces of the flaring or funnel-shaped mouths of the spittoons. The water, together with any foreign matter deposited in said spittoons, then passes through the extended arms 7 into discharge-pipe and foot-rail 1, thence through pipe 10 into the sewer or other receptacle, and as the flow of water is uninterrupted, as above stated, it will be apparent that the spittoon and connections leading therefrom will be kept in a clean and perfect sanitary condition.

It is evident that changes in the construction and relative arrangement of the several parts might be made without avoiding our invention, and hence we do not restrict ourselves to the particular construction and arrangement of parts shown and described; but, Having fully described our invention, what we claim as new, and desire to secure by Letters Patent, is—

The combination with a counter or other upright structure, and two pipes 1 and 8 located on opposite sides thereof, one a drain-pipe and the other a supply-pipe and the drain-pipe having the secondary function of serving as a foot-rest, of a spittoon having a short pipe leading from its bottom into the discharge-pipe, a pipe leading from the supply into and discharging at the top of the spittoon whereby the contents are washed down and out of the spittoon.

In testimony whereof we have have signed this specification in the presence of two subscribing witnesses.

JOHN SOLTWEDEL.
EDWARD MATHIAS.

Witnesses:
JAMES G. DAVIDSON,
TONY VOGT.